July 22, 1952     M. MORGAN ET AL     2,604,366
BEARING

Filed Dec. 6, 1949     2 SHEETS—SHEET 1

INVENTORS
MYLES MORGAN
JOSEPH M. O'MALLEY

BY *Albert G. Blodgett*
ATTORNEY

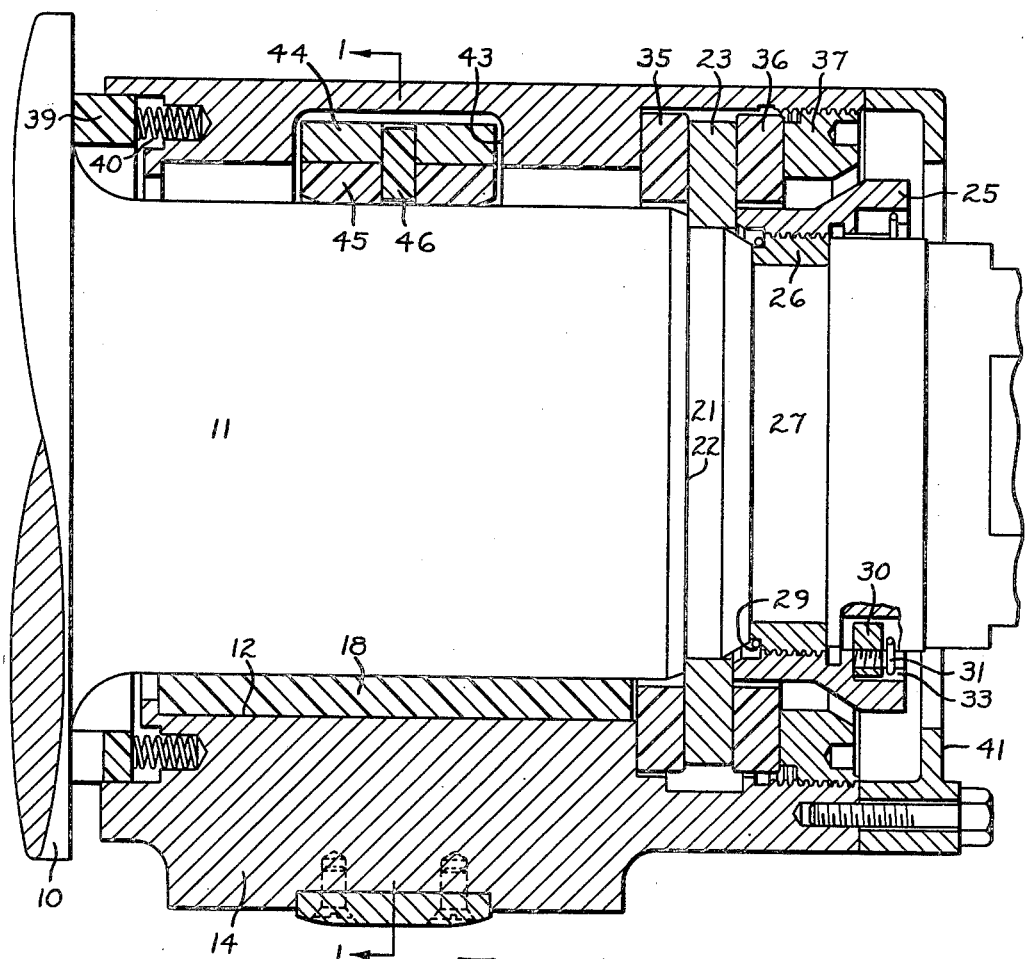

Patented July 22, 1952

2,604,366

UNITED STATES PATENT OFFICE 2,604,366

BEARING

Myles Morgan and Joseph M. O'Malley, Worcester, Mass., assignors to Morgan Construction Company, Worcester, Mass., a corporation of Massachusetts Application December 6, 1949, Serial No. 131,438

1 Claim. (Cl. 308—58)

This invention relates to bearings, and more particularly to bearings for supporting the necks of the lower roll in a horizontal rolling mill as employed in the rolling of metal.

It has been proposed heretofore to construct such a bearing with a segmental liner of phenolic resin or similar non-metallic material which engages the lower surface of the roll neck and thus receives the downward radial load due to the rolling operation. It has also been proposed to provide a shoe lined with phenolic resin and urged downwardly against the upper surface of the roll neck by means of springs and levers to hold the roll firmly in position and prevent it from jumping when no stock is traveling through the mill. The prior bearings of this nature have been complicated and expensive to manufacture, and in some cases in which the bearings are deluged with water during operation, the springs have rusted and weakened.

It is accordingly one object of the invention to provide an improved roll neck bearing particularly suitable for lower rolls, which will be simpler and less expensive to manufacture than prior bearings.

It is a further object of the invention to provide a roll neck bearing for lower rolls, the bearing including a spring loaded hold-down mechanism to prevent jumping of the roll, the parts being constructed and arranged to protect the springs from rusting.

It is a further object of the invention to provide a roll neck bearing for lower rolls, the bearing including a hold-down mechanism to prevent jumping of the roll, the said mechanism having a new and advantageous arrangement of springs capable of providing ample force for hold-down purposes.

With these and other objects in view, as will be apparent to those skilled in the art, the invention resides in the combination of parts set forth in the specification and covered by the claim appended hereto.

Referring to the drawings illustrating one embodiment of the invention and in which like reference numerals indicate like parts:

Fig. 4 is a section taken on the line 4—4 of Fig. 1.

Figure 1:
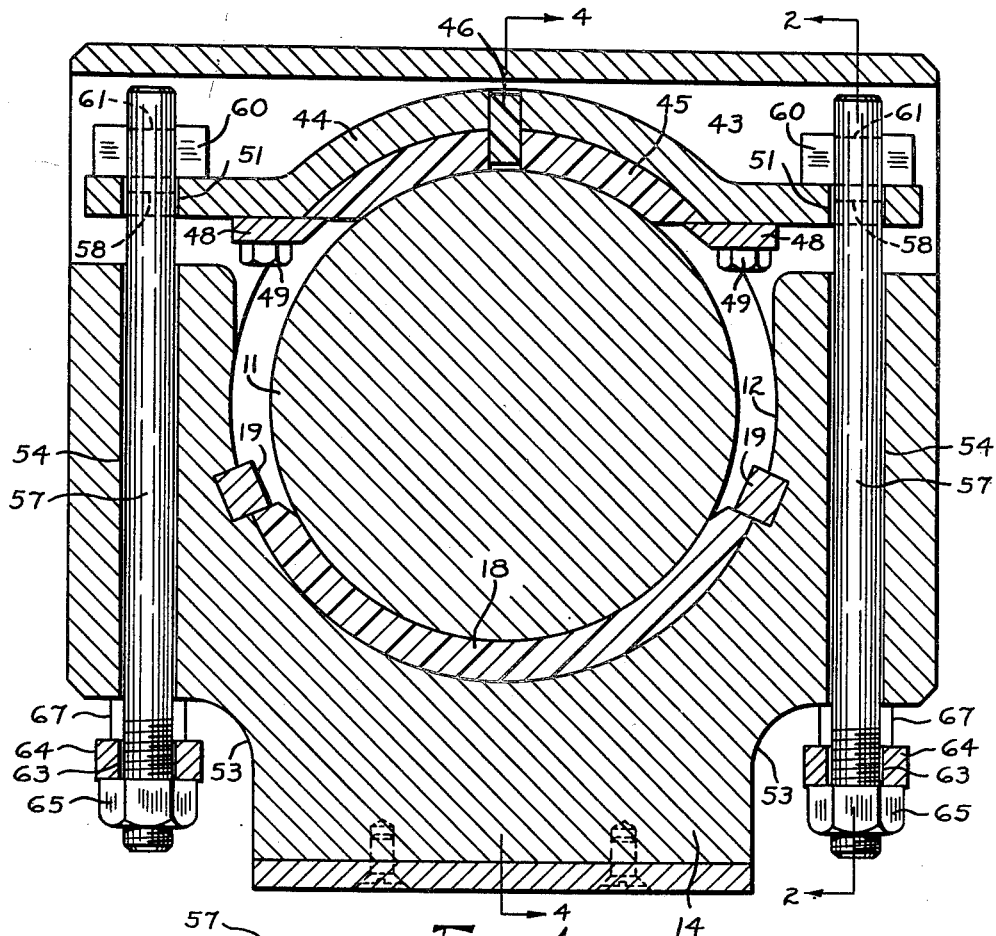
Fig. 1 is a transverse section through a lower roll neck bearing and an associated roll, the section being taken on the line 1—1 of Fig. 4.

The embodiment illustrated comprises a rolling mill roll 10 having a cylindrical roll neck 11. The particular roll shown is the lower roll of a 2-high horizontal mill. The roll neck 11 extends through a bore 12 in a bearing chock or casing 14 which is adapted to be mounted in the window of a roll housing (not shown). Within the lower portion of the bore 12 there is mounted an arcuate liner 18 of phenolic resin or other suitable non-metallic material which engages the bottom of the roll neck 11 to receive the heavy downwardly directed radial load resulting from the rolling operation. As shown in Fig. 1, this liner 18 is held in place by means of two metal bars 19 engaging its opposite edges and suitably secured to the chock.

Referring now to Fig. 4, it will be seen that the roll neck 11 is formed with a portion 21 which is reduced slightly in diameter to provide a shoulder 22. A metal ring 23 is suitably keyed to the portion 21 and held firmly against the shoulder 22 by means of a nut 25 which surrounds a threaded ring 26 mounted in a groove 27 in the roll neck and keyed thereto. For assembly purposes this threaded ring is divided along an axial plane into two pieces which are retained in the groove 27 by means of a garter spring 29. In order to prevent the nut 25 from loosening in service it is secured to the roll neck by a key 30 which is held in place by a wire snap ring 31. This key is arranged to engage any one of a series of notches 33 formed in the nut 25. The metal ring 23 is provided on its opposite sides with plane surfaces forming shoulders for sliding engagement with an inner thrust ring 35 and an outer thrust ring 36 suitably mounted within the chock 14. These thrust rings are formed of phenolic resin or other suitable non-metallic material. The outer thrust ring 36 is held in place by an adjusting ring 37 having external screw threads for engagement with internal screw threads in the chock. For a further description of this construction and of the means for keying the thrust rings against rotation, reference may be had to the prior patent to Rich et al. No. 2,367,613 granted January 16, 1945. In order to exclude scale and other foreign matter from the bearing, a ring 39 of phenolic resin or the like is mounted on the inner end of the chock 14 and urged against the adjacent end of the roll 11 by springs 40. An annular splash guard 41 is mounted on the outer end of the chock and surrounds the outer portion of the nut 25.

Means is provided to hold the roll neck 11 downwardly against the concave surface of the liner 18 and thereby prevent jumping of the roll when no stock is traveling through the mill. For this purpose a transverse recess 43 is provided in the upper portion of the chock 14, this recess intersecting the upper part of the bore 12. Within the recess 43 there is mounted a hold-down shoe comprising a horizontal metal plate 44 which carries on its lower surface an arcuate liner 45 of phenolic resin or the like in contact with the upper surface of the roll neck 11. The liner 45 is secured to the metal plate 44 by a centrally located vertical phenolic resin dowel pin 46 and by metal clips 48 engaging the ends of the liner 45 and fastened to the plate 44 by screws 49 (Fig. 1). Vertical holes 51 are formed in the two end portions of the plate 44.

Figure 2:
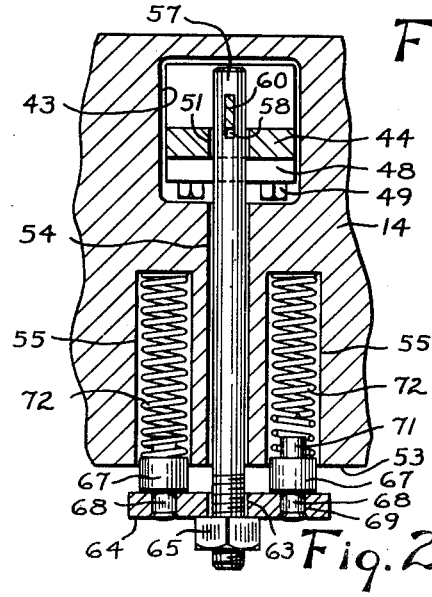
Fig. 2 is a fragmentary section on a reduced scale, taken on the line 2—2 of Fig. 1.
Figure 3:
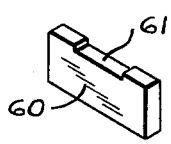
Fig. 3 is a perspective view of a key forming a part of the bearing.

The lower corners of the chock 14 (Fig. 1) on opposite sides of the bore 12, are cut away to provide notches 53, and from each of these notches a substantially vertical opening 54 extends upwardly through the chock and into the recess 43. These openings 54 are preferably circular in cross section, and they are aligned with the respective holes 51 in the plate 44. As shown in Fig. 2, two additional substantially vertical openings or pockets 55 extend upwardly from each notch 53 for an appreciable distance into the chock, their upper ends being closed. These pockets 55 are preferably circular in cross section, and the pockets in each pair are located on opposite sides of the corresponding opening 54 and in a common vertical plane therewith, the said plane being parallel with the axis of the bore 12.

Within each opening 54 there is mounted a vertically slidable cylindrical rod 57 provided with an opening 58 of rectangular cross section through its upper portion and with its lower portion screw-threaded. The upper portion of each rod 57 extends through the corresponding hole 51 in the plate 44, and a key 60 with a shallow notch 61 in its upper surface extends through the opening 58 and engages the upper surface of the plate 44. The lower portion of each rod 57 extends through a hole 63 in the center of a horizontal bar 64. A nut 65 is mounted on each rod 57 beneath the bar. Each bar 64 is provided with two upwardly projecting cylindrical bosses 67 located at opposite sides of the central hole 63 and extending into the lower ends of the chock openings 55. For convenience in manufacture, each boss 67 is formed as a separate piece having a downwardly projecting nipple 68 which extends through a suitably located hole 69 in the bar 64. The lower ends of the holes 69 are slightly countersunk, and at assembly the nipples 68 are headed over into the countersunk portions. Each boss 67 is also formed with an upwardly projecting nipple 71. Within each of the chock openings 55 there is provided a coiled compression spring 72 with its lower end portion engaging the corresponding boss 67 and surrounding the associated nipple 71.

It will now be apparent that in the operation of the bearing the compression springs 72 will urge the bars 64 downwardly and thereby place the rods 57 in tension. Since the upper ends of the rods are connected to the ends of the plate 44 by means of the keys 60, this plate will be urged downwardly and the liner 45 will be held in firm contact with the roll neck 11 to prevent any jumping of the roll. There being two of the springs 72 for each rod 57, ample force will be available for the purpose. The nuts 65 can be adjusted to vary the tension in the rods as desired. Since the chock openings 55 are closed at their upper ends, no water can enter them to cause rusting of the springs 72. When the bearings are removed from the roll necks, the hold-down plates 44 will remain in position, for the rods 57 cannot be withdrawn from the chock openings 54 until the keys 60 are removed. The bearings are relatively simple, compact, and inexpensive to manufacture.

It will be understood that suitable means will be provided to supply water to the bearings for lubrication and cooling thereof in known manner. It should further be noted that whereas the bearing disclosed is particularly adapted for use as a lower bearing in a horizontal rolling mill, it might be inverted and employed as an upper bearing in a horizontal mill, with the plate 44 supporting the weight of the upper roll, or the bearing might be installed in a vertical mill. Hence such descriptive words as "horizontal," "vertical," "upper," "lower" and the like, employed in the claims, are not to be considered as limitations except as they define the relative positions of the various parts.

Having thus described our invention, what we claim as new and desire to secure by Letters Patent is:

A bearing for a rotatable horizontal roll neck or the like comprising a chock having a horizontal bore for reception of the roll neck, a transverse horizontal recess intersecting the upper portion of the bore, two vertical openings extending downwardly through the chock from opposite ends of the recess, and two pockets in the bottom of the chock on opposite sides of each opening, the upper ends of the pockets being closed, a liner mounted in the lower portion of the bore and having a concave upper surface for contact with the roll neck to receive the rolling pressure, a shoe mounted in the recess for contact with the upper surface of the roll neck, two vertical rods connected at their upper ends to opposite ends of the shoe and extending downwardly through the respective openings, a transverse bar on the lower end of each rod, and a compression spring in each pocket, the lower ends of the springs engaging the bars to urge the bars and rods downwardly.

MYLES MORGAN.
JOSEPH M. O'MALLEY.

REFERENCES CITED

The following references are of record in the file of this patent:

UNITED STATES PATENTS

| Number | Name | Date |
|---|---|---|
| 2,367,613 | Rich | Jan. 18, 1945 |

FOREIGN PATENTS

| Number | Country | Date |
|---|---|---|
| 632,792 | France | Jan. 14, 1928 |
| 560,274 | Great Britain | Mar. 28, 1944 |